(12) United States Patent
Dos Reis Costa et al.

(10) Patent No.: US 12,722,486 B2
(45) Date of Patent: Sep. 1, 2026

(54) AUGMENTED REALITY INTERFACES FOR SPEED REGULATION THROUGH OPTICAL ILLUSIONS

(71) Applicant: TOYOTA RESEARCH INSTITUTE, INC., Los Altos, CA (US)

(72) Inventors: Jean Marcel Dos Reis Costa, San Jose, CA (US); Tiffany Litien Chen, Mountain View, CA (US); Emily Sarah Sumner, Mountain View, CA (US); Allison Marie Morgan, Oakland, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 357 days.

(21) Appl. No.: 18/182,987

(22) Filed: Mar. 13, 2023

(65) Prior Publication Data

US 2024/0308335 A1 Sep. 19, 2024

(51) Int. Cl.

| | |
|---|---|
| ***B60K 35/28*** | (2024.01) |
| *B60K 35/23* | (2024.01) |
| *B60K 35/60* | (2024.01) |

(52) U.S. Cl.

CPC .............. *B60K 35/28* (2024.01); *B60K 35/23* (2024.01); *B60K 35/60* (2024.01); *B60K 2360/167* (2024.01); *B60K 2360/177* (2024.01); *B60K 2360/785* (2024.01)

(58) Field of Classification Search

CPC .. B60K 35/00; B60K 2360/785; B60K 35/23; B60K 35/232; B60K 35/233; B60K 35/234; B60K 35/28; B60K 35/29

See application file for complete search history.

(56) References Cited

U.S. PATENT DOCUMENTS

| | | | |
|---|---|---|---|
| 9,251,715 | B2 | 2/2016 | Hing et al. |
| 10,083,613 | B2 | 9/2018 | Atsmon et al. |
| 10,793,152 | B2 | 10/2020 | Limbacher |

FOREIGN PATENT DOCUMENTS

| | | | | |
|---|---|---|---|---|
| JP | 2018092442 A * | 6/2018 | ............. B60K 35/00 |
| KR | 20170004127 A | 1/2017 | |
| WO | 2014029788 A1 | 2/2014 | |

* cited by examiner

*Primary Examiner* — Ramya P Burgess
(74) *Attorney, Agent, or Firm* — SEYFARTH SHAW LLP

(57) ABSTRACT

A method for an unsafe speed intervention system is described. The method includes determining whether an initial speed of a vehicle is unsafe. The method also includes displaying an augmented reality pattern on a windshield of the vehicle moving at a selected speed in response to determining the initial speed of the vehicle is unsafe. The method further includes monitoring a current speed of the vehicle after displaying the augmented reality pattern. The method also includes adjusting the selected speed of the augmented reality pattern displayed on the vehicle windshield in response to the monitoring the current speed of the vehicle.

20 Claims, 9 Drawing Sheets

AUGMENTED REALITY INTERFACES FOR SPEED REGULATION THROUGH OPTICAL ILLUSIONS

BACKGROUND

Field

Certain aspects of the present disclosure generally relate to autonomous vehicle technology and, more particularly, to augmented reality interfaces for speed regulation through optical illusions.

Background

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number.

These different levels of autonomous vehicles may provide a safety system that improves driving of a vehicle. For example, in a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system.

Interaction with the set of ADAS features available from a vehicle generally involves a human-machine-interface (HMI). The HMI of a vehicle may fuse sensor data. Unfortunately, the sensor data captured in these vehicle HMI systems is not considered for speed regulation through optical illusions to promote safe driving conditions.

SUMMARY

A method for an unsafe speed intervention system is described. The method includes determining whether an initial speed of a vehicle is unsafe. The method also includes displaying an augmented reality pattern on a windshield of the vehicle moving at a selected speed in response to determining the initial speed of the vehicle is unsafe. The method further includes monitoring a current speed of the vehicle after displaying the augmented reality pattern. The method also includes adjusting the selected speed of the augmented reality pattern displayed on the vehicle windshield in response to the monitoring the current speed of the vehicle.

A non-transitory computer-readable medium having program code recorded thereon for an unsafe speed intervention system is described. The program code is executed by a processor. The non-transitory computer-readable medium includes program code to determine whether an initial speed of a vehicle is unsafe. The non-transitory computer-readable medium also includes program code to overlay an augmented reality pattern on a windshield of the vehicle moving at a selected speed in response to determining the initial speed of the vehicle is unsafe. The non-transitory computer-readable medium further includes program code to monitor a current speed of the vehicle after displaying the augmented reality pattern. The non-transitory computer-readable medium also includes program code to adjust the selected speed of the augmented reality pattern displayed on the vehicle windshield in response to the monitoring the current speed of the vehicle.

A system for an unsafe speed intervention is described. The system includes an unsafe speed detection module to determine whether an initial speed of a vehicle is unsafe. The system also includes an augmented reality (AR) pattern overlay module to overlay an augmented reality pattern on a windshield of the vehicle moving at a selected speed in response to determining the initial speed of the vehicle is unsafe. The system also further includes a vehicle speed monitor module to monitor a current speed of the vehicle after displaying the augmented reality pattern. The system also includes an AR pattern speed adjustment module to adjust the selected speed of the augmented reality pattern displayed on the vehicle windshield in response to the monitoring the current speed of the vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
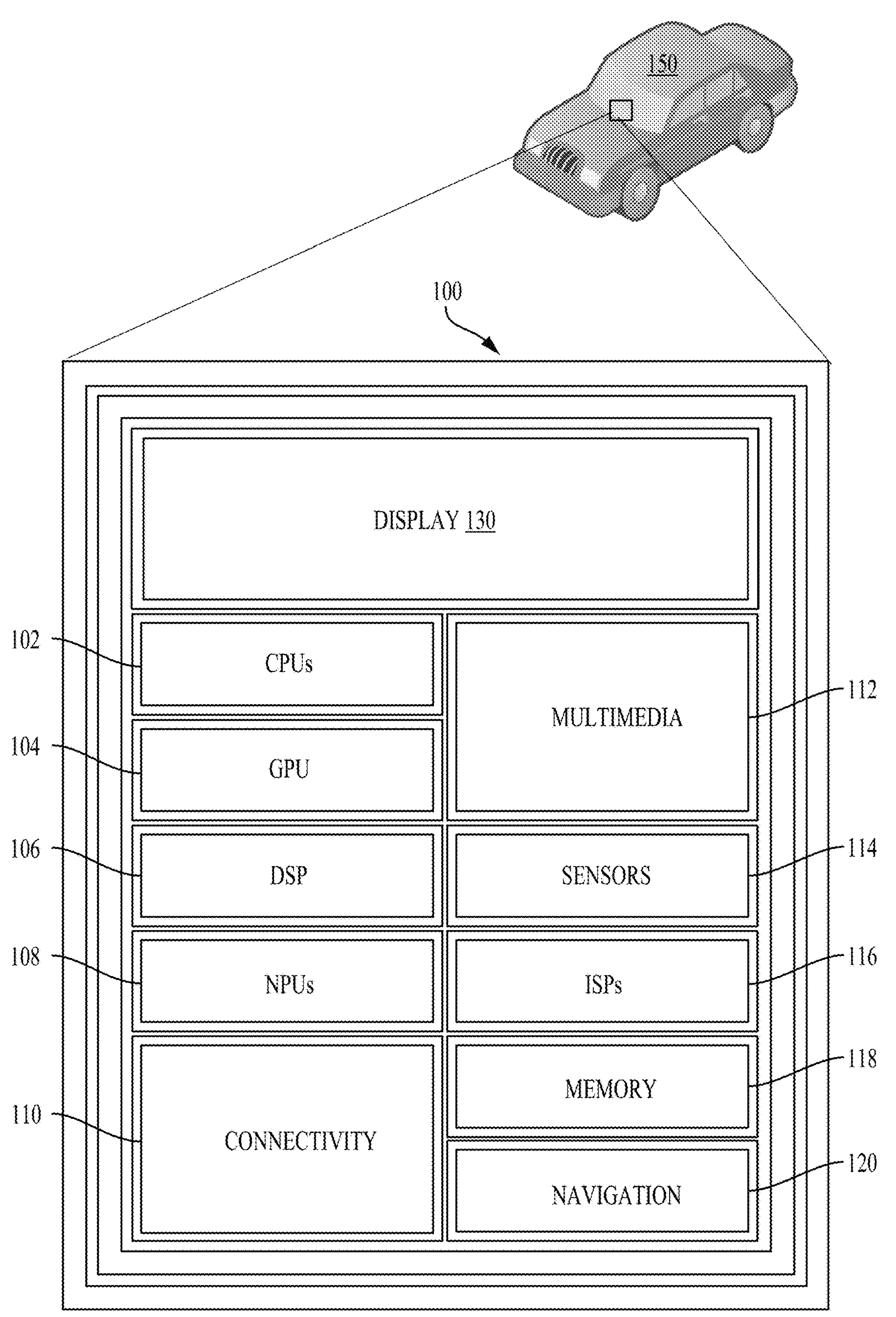
FIG. 1 illustrates an example implementation of designing a neural network using a system-on-a-chip (SOC) for an unsafe speed intervention system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Many road accidents happen daily due to speeding. The speedometer is the primary vehicle resource that drivers use to adjust their speed. However, drivers may still go over the speed limit when they fail to check the speedometer. Other solutions are also available to help drivers manage their speed, such as audio warnings and intelligent speed assistance, but drivers may still refrain from slowing down, either because they consider the speed appropriate, because they are trying to keep up with traffic, or for other reasons.

In addition to using vehicle technologies to manage their speed, drivers also rely on other visual cues to estimate how fast they are driving, including the motion perception of other vehicles, trees, and road surfaces. Road designers have been successfully using road markings to encourage drivers to slow down by using optical illusions to change speed perception. Examples include transverse markings, chevron markings, and optical speed bars. Nevertheless, this approach of using optical illusions for speed regulation is not explored in the design of in-vehicle interfaces.

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number.

These various levels of autonomous vehicles may provide a safety system that improves driving of a vehicle. For example, in a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system.

Interaction with the set of ADAS features available from a vehicle involves a human-machine-interface (HMI). The HMI of a vehicle may communicate driving conditions to the vehicle operator. Unfortunately, the vehicle HMI system is not considered for speed regulation through optical illusions to promote safe driving conditions. Conventional drivers typically rely partly on a vehicle's speedometer to judge a vehicle's speed. Nevertheless, drivers may also rely on visual cues to estimate how fast they are driving without having to rely on the vehicle's speedometer. For example, such cues include motion perception of other vehicles, trees, road surfaces, and the like. In practice, optical illusions may cause drivers to perceive that they are speeding up or driving faster than their actual speed, which may encourage drivers to slow down. Examples of this include transverse markings, chevron markings, and optical speed bars.

Some aspects of the present disclosure are directed to using augmented reality (AR) cues on a vehicle windshield to change drivers' speed perception, which helps drivers slow down, or speed up, as desired. A system can detect when the speed of a vehicle is inappropriate (either too slow or too fast) based on a variety of factors including the speed limit, weather conditions, traffic conditions, road conditions, and the like. When it is determined that the vehicle speed is inappropriate, an augmented reality animation is displayed on the vehicle's windshield showing a visual pattern that continuously moves at a certain speed. In some aspects of the present disclosure, the visual pattern can be transverse markings, chevron markings, optical speed bars, trees, lamps, or other markings that cause a driver to perceive vehicle speed.

For example, the speed of the augmented reality visual pattern can be adjusted to give drivers the illusion that they are driving faster or slower than they actually are in order to encourage the drivers to adjust their speed. In this example, if the vehicle is moving too fast, the speed of the pattern is adjusted, such that the vehicle appears to move even faster. If the vehicle is moving too slow, the speed of the pattern is adjusted, such that the vehicle appears to move even slower. By making the drivers think that they are driving even faster or slower than they are, the drivers may be encouraged to slow down or speed up. In some aspects of the present disclosure, after the augmented reality pattern is displayed, the vehicle speed may continue to be monitored. If additional vehicle speed adjustments are desired, the speed of the augmented reality pattern is adjusted. If the driver adjusts the vehicle speed to an appropriate speed, the augmented reality pattern is removed.

FIG. 1 illustrates an example implementation of the system and method for an unsafe speed regulation system using a system-on-a-chip (SOC) 100 of a vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to an unsafe speed intervention system based on speed data processed by the processor (e.g., CPU 102).

The instructions loaded into a processor (e.g., CPU 102) may also include program code to determine whether an initial speed of the vehicle 150 is unsafe. The instructions loaded into a processor (e.g., CPU 102) may also include program code to overlay an augmented reality pattern on the vehicle windshield moving at a selected speed in response to the program code to determine whether the initial speed of the vehicle is unsafe. The instructions loaded into a processor (e.g., CPU 102) may also include program code to monitor a current speed of the vehicle after the program code to overlay the augmented reality pattern. The instructions loaded into a processor (e.g., CPU 102) may also include program code to adjust the selected speed of the augmented reality pattern displayed on the vehicle windshield in response to the program code to monitor the current speed of the vehicle.

Figure 2:
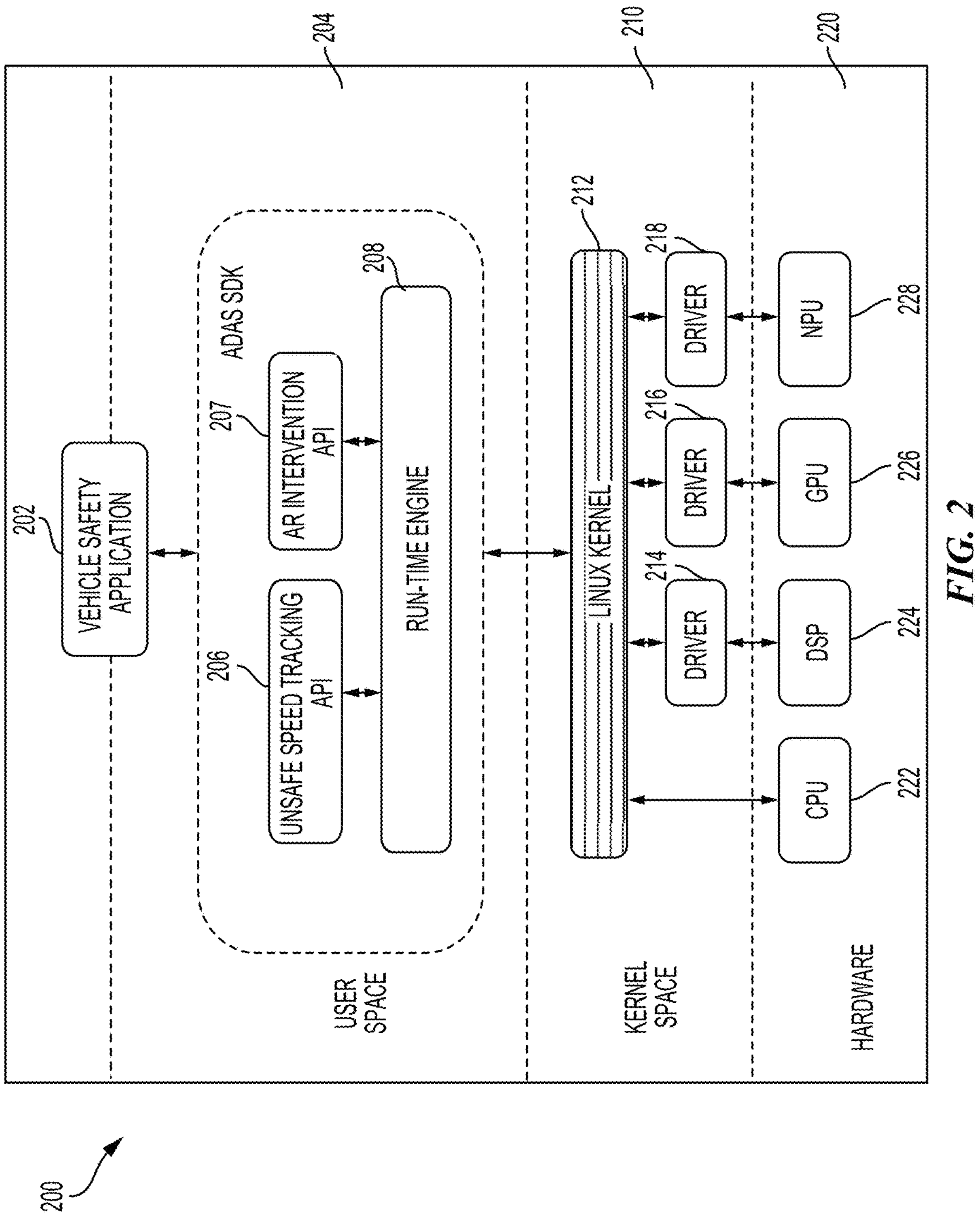
FIG. 2 is a block diagram illustrating a software architecture that may modularize artificial intelligence (AI) functions for an unsafe speed intervention system of an autonomous agent, according to aspects of the present disclosure.

FIG. 2 is a block diagram illustrating a software architecture 200 that may modularize artificial intelligence (AI) functions for an unsafe speed intervention system, according to aspects of the present disclosure. Using the architecture, a vehicle safety application 202 may be designed such that it may cause various processing blocks of a system-on-a-chip (SOC) 220 (for example a CPU 222, a DSP 224, a GPU 226, and/or an NPU 228) to perform supporting computations during run-time operation of the vehicle safety application 202. While FIG. 2 describes the software architecture 200 for unsafe speed intervention features, it should be recognized that unsafe speed intervention features are not limited to autonomous agents. According to aspects of the present disclosure, an unsafe speed intervention system is applicable to any vehicle type, provided the vehicle is equipped with appropriate functions of an advanced driver assistance system (ADAS).

The vehicle safety application 202 may be configured to call functions defined in a user space 204 that may, for example, provide for vehicle safety services. The vehicle safety application 202 may make a request to compile program code associated with a library defined in an unsafe speed tracking application programming interface (API) 206 to detect when an initial speed of a vehicle is unsafe. The vehicle safety application 202 may also make a request to compile program code associated with a library defined in an augmented reality (AR) intervention API 207 to display an augmented reality pattern on the vehicle windshield moving at a selected speed in response to the program code to determine whether the initial speed of the vehicle is unsafe and continue to monitor a current speed of the vehicle after the display of the augmented reality pattern. The AR intervention API 207 may also adjust the selected speed of the augmented reality pattern displayed on the vehicle windshield in response to monitoring the current speed of the vehicle.

A run-time engine 208, which may be compiled code of a runtime framework, may be further accessible to the vehicle safety application 202. The vehicle safety application 202 may cause the run-time engine 208, for example, to take actions for communicating with a vehicle operator. When the vehicle operator begins to interact with a vehicle interface, the run-time engine 208 may in turn send a signal to an operating system 210, such as a Linux Kernel 212, running on the SOC 220. FIG. 2 illustrates the Linux Kernel 212 as software architecture for implementing vehicle eye tracking features of the vehicle. It should be recognized; however, aspects of the present disclosure are not limited to this exemplary software architecture. For example, other kernels may be used to provide the software architecture to support the unsafe speed intervention functionality using AR pattern display functionality to provide improved ADAS speed safety functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
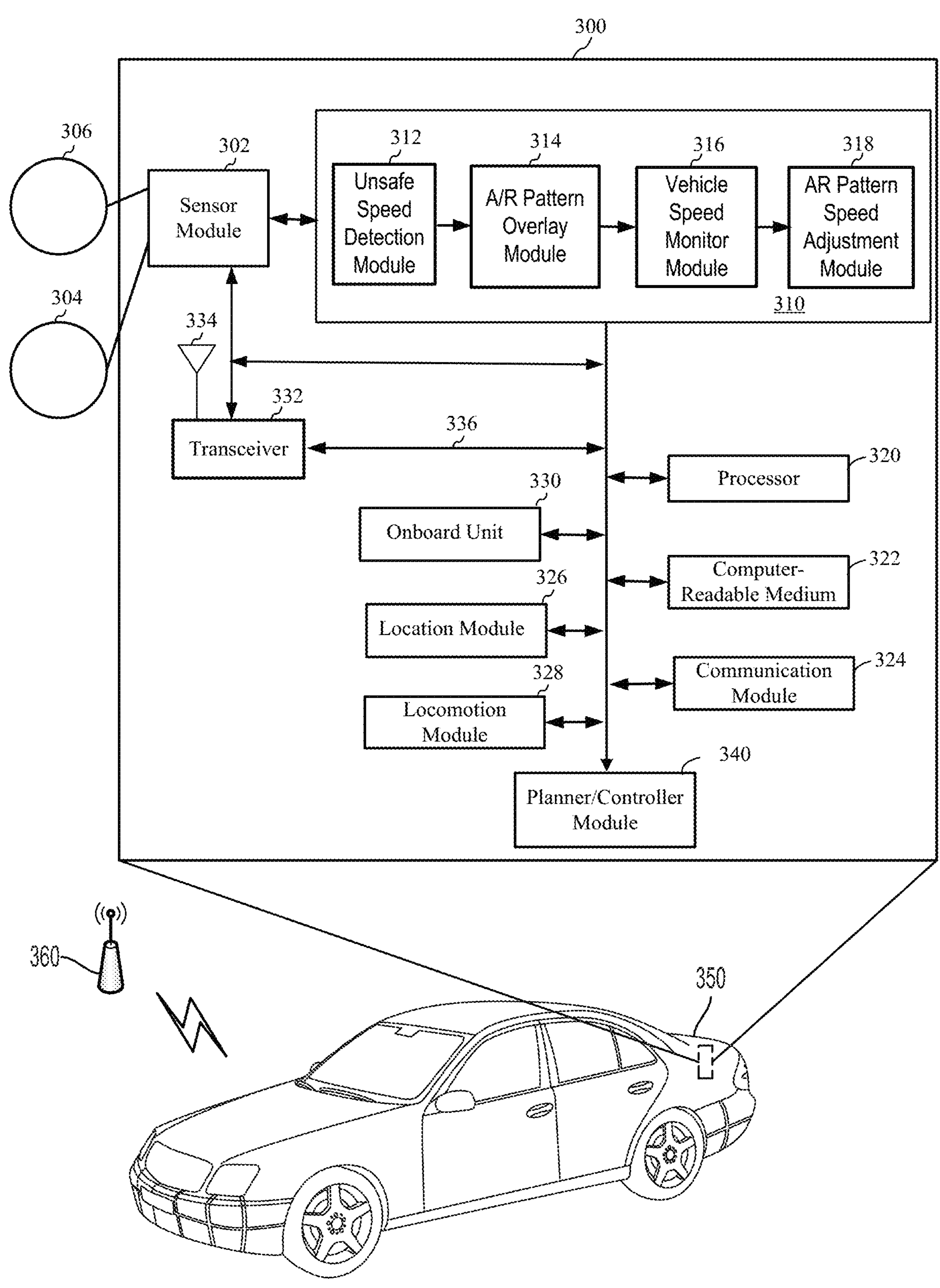
FIG. 3 is a diagram illustrating an example of a hardware implementation for an unsafe speed intervention system, according to aspects of the present disclosure.

FIG. 3 is a diagram illustrating an example of a hardware implementation for an unsafe speed intervention system 300, according to aspects of the present disclosure. The unsafe speed intervention system 300 may be directed to using augmented reality (AR) cues on a windshield of a car 350 to change drivers' speed perception, which helps drivers slow down, or speed up, as desired. The unsafe speed intervention system 300 may be a component of a vehicle, a robotic device, or other non-autonomous device (e.g., non-autonomous vehicles). For example, as shown in FIG. 3, the unsafe speed intervention system 300 is a component of the car 350.

Aspects of the present disclosure are not limited to the unsafe speed intervention system 300 being a component of the car 350. Other devices, such as a bus, motorcycle, or other like non-autonomous vehicle, are also contemplated for implementing the unsafe speed intervention system 300. In this example, the car 350 may be autonomous or semi-autonomous; however, other configurations for the car 350 are contemplated, such as an advanced driver assistance system (ADAS).

The unsafe speed intervention system 300 may be implemented with an interconnected architecture, represented generally by an interconnect 336, such as a controller area network (CAN). The interconnect 336 may include any number of point-to-point interconnects, buses, and/or bridges depending on the specific application of the unsafe speed intervention system 300 and the overall design constraints. The interconnect 336 links together various circuits including one or more processors and/or hardware modules, represented by a sensor module 302, a vehicle ADAS controller 310, a processor 320, a computer-readable medium 322, a communication module 324, a location module 326, a locomotion module 328, an onboard unit 330, and a planner/controller module 340. The interconnect 336 may also link various other circuits such as timing sources, peripherals, voltage regulators, and power management circuits, which are well known in the art, and therefore, will not be described any further.

The unsafe speed intervention system 300 includes a transceiver 332 coupled to the sensor module 302, the vehicle ADAS controller 310, the processor 320, the computer-readable medium 322, the communication module 324, the location module 326, the locomotion module 328, the onboard unit 330, and the planner/controller module 340. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle ADAS controller 310 to/from connected vehicles within the vicinity of the car 350.

The unsafe speed intervention system 300 includes the processor 320 coupled to the computer-readable medium 322. The processor 320 performs processing, including the execution of software stored on the computer-readable medium 322 to provide functionality according to the disclosure. The software, when executed by the processor 320, causes the unsafe speed intervention system 300 to direct a greater share of computational resources of the vehicle ADAS controller 310 to perceptual tasks pertaining to region(s) of a scene surrounding a car 350 to which a driver is not paying attention, or any of the modules (e.g., 302, 310, 324, 326, 328, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images of the vehicle operator. The second sensor 304 may be a ranging sensor, such as a light detection and ranging (LIDAR) sensor or a radio detection and ranging (RADAR) sensor for capturing an external vehicle environment. Of course, aspects of the present disclosure are not limited to the sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle ADAS controller 310, the communication module 324, the location module 326, the locomotion module 328, the onboard unit 330, and/or the planner/controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 326 may determine a location of the car 350. For example, the location module 326 may use a global positioning system (GPS) to determine the location of the car 350. The location module 326 may implement a dedicated short-range communication (DSRC)-compliant GPS unit. A DSRC-compliant GPS unit includes hardware and software to make the car 350 and/or the location module 326 compliant with one or more of the following DSRC standards, including any derivative or fork thereof: EN 12253:2004 Dedicated Short-Range Communication-Physical layer using microwave at 5.8 GHZ (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); and EN ISO 14906:2004 Electronic Fee Collection-Application interface.

The communication module 324 may facilitate communications via the transceiver 332. For example, the communication module 324 may be configured to provide communication capabilities via different wireless protocols, such as 6G, 5G NR. WiFi, long term evolution (LTE), 4G, 3G, etc. The communication module 324 may also communicate with other components of the car 350 that are not modules of the unsafe speed intervention system 300. The transceiver 332 may be a communications channel through a network access point 360. The communications channel may include DSRC. 6G, 5G NR, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G NR, 6G, LTE, LTE-V2X, LTE-D2D, VOLTE, or any other mobile data network or combination of mobile data networks. Further, the network access point 360 may include one or more IEEE 802.11 wireless networks.

The unsafe speed intervention system 300 also includes the planner/controller module 340 for planning a route and controlling the locomotion of the car 350, via the locomotion module 328 for autonomous operation of the car 350. In one configuration, the planner/controller module 340 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3. Level 4, and Level 5). For example, if an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. These various levels of autonomous vehicles are described briefly below.

Level 0: In a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle ADAS controller 310 may be in communication with the sensor module 302, the processor 320, the computer-readable medium 322, the communication module 324, the location module 326, the locomotion module 328, the onboard unit 330, the transceiver 332, and the planner/controller module 340. In one configuration, the vehicle ADAS controller 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle ADAS controller 310 may receive sensor data directly from the first sensor 306 and the second sensor 304 to determine, for example, input traffic data images.

Interaction with the set of ADAS features available from a vehicle involves a human-machine-interface (HMI). The HMI of a vehicle may communicate driving conditions to the operator of the car 350. Unfortunately, the vehicle HMI system is not considered for speed regulation through optical illusions to promote safe driving conditions. Conventional drivers typically rely partly on a vehicle's speedometer to judge a vehicle's speed. Nevertheless, drivers may also rely on visual cues to estimate how fast they are driving without having to rely on the vehicle's speedometer. For example, such cues include motion perception of other vehicles, trees, road surfaces, and the like. In practice, optical illusions may cause drivers to perceive that they are speeding up or driving faster than their actual speed, which may encourage drivers to slow down.

In some aspects of the present disclosure, the unsafe speed intervention system 300 displays augmented reality (AR) cues on a windshield of the car 350 to change the drivers' speed perception to either slow down or speed up the car 350. In particular, the unsafe speed intervention system 300 can detect when the speed of the car is inappropriate (e.g., unsafe by being too slow or too fast) based on a variety of factors including the speed limit, weather conditions, traffic conditions, road conditions, and the like. When it is determined that the vehicle speed is inappropriate, an augmented reality animation is displayed on the windshield of the car 350 showing a visual pattern that continuously moves at a certain speed. In some aspects of the present disclosure, the visual pattern can be transverse markings, chevron markings, optical speed bars, trees, lamps, or other markings that cause a drive of the car 350 to perceive vehicle speed.

As shown in FIG. 3, the unsafe speed intervention system 300 includes the vehicle ADAS controller 310 that includes an unsafe speed detection module 312, an augmented reality (AR) pattern overlay module 314, a vehicle speed monitor module 316, and an AR pattern speed adjustment module 318. The unsafe speed detection module 312, the AR pattern overlay module 314, the vehicle speed monitor module 316, and the AR pattern speed adjustment module 318 may be components of a same or different artificial neural network, such as a deep convolutional neural network (CNN). The vehicle ADAS controller 310 is not limited to a CNN.

The unsafe speed detection module 312 determines whether an initial speed of the car 350 is unsafe. In some aspects of the present disclosure, the unsafe speed detection module 312 uses various factors to determine if the initial speed of the car 350 is unsafe. For example, an unsafe speed may be determined based on the speed limit, current traffic congestion level, road conditions, and/or personal factors of the drivers. The unsafe speed detection module 312 is configured to detect situations in which the drivers fail to properly adjust their speed, whether consciously or unconsciously. In some aspects of the present disclosure, the unsafe speed intervention system 300 is directed to providing an interface of the car 350 that encourages drivers to regulate their speed when appropriate.

In these aspects of the present disclosure, the AR pattern overlay module 314 is configured to overlay an AR pattern on the vehicle windshield, moving at a selected speed in response to determining that the initial speed of the car is unsafe, using the unsafe speed detection module 312. Based on the overlayed AR pattern, the vehicle speed monitor module 316 is configured to monitor a current speed of the car 350 after the program code to overlay the AR pattern by the AR pattern overlay module 314. Based on the speed of the car 350, the AR pattern speed adjustment module 318 is configured to adjust the selected speed of the augmented reality pattern overlayed on the windshield of the car 350 in response to the unsafe speed detection module 312 monitoring the current speed of the car 350. The unsafe speed intervention system 300 may adjust the speed of the overlayed AR pattern until the speed of the car 350 is adjusted to a safe speed.

Figure 4A:
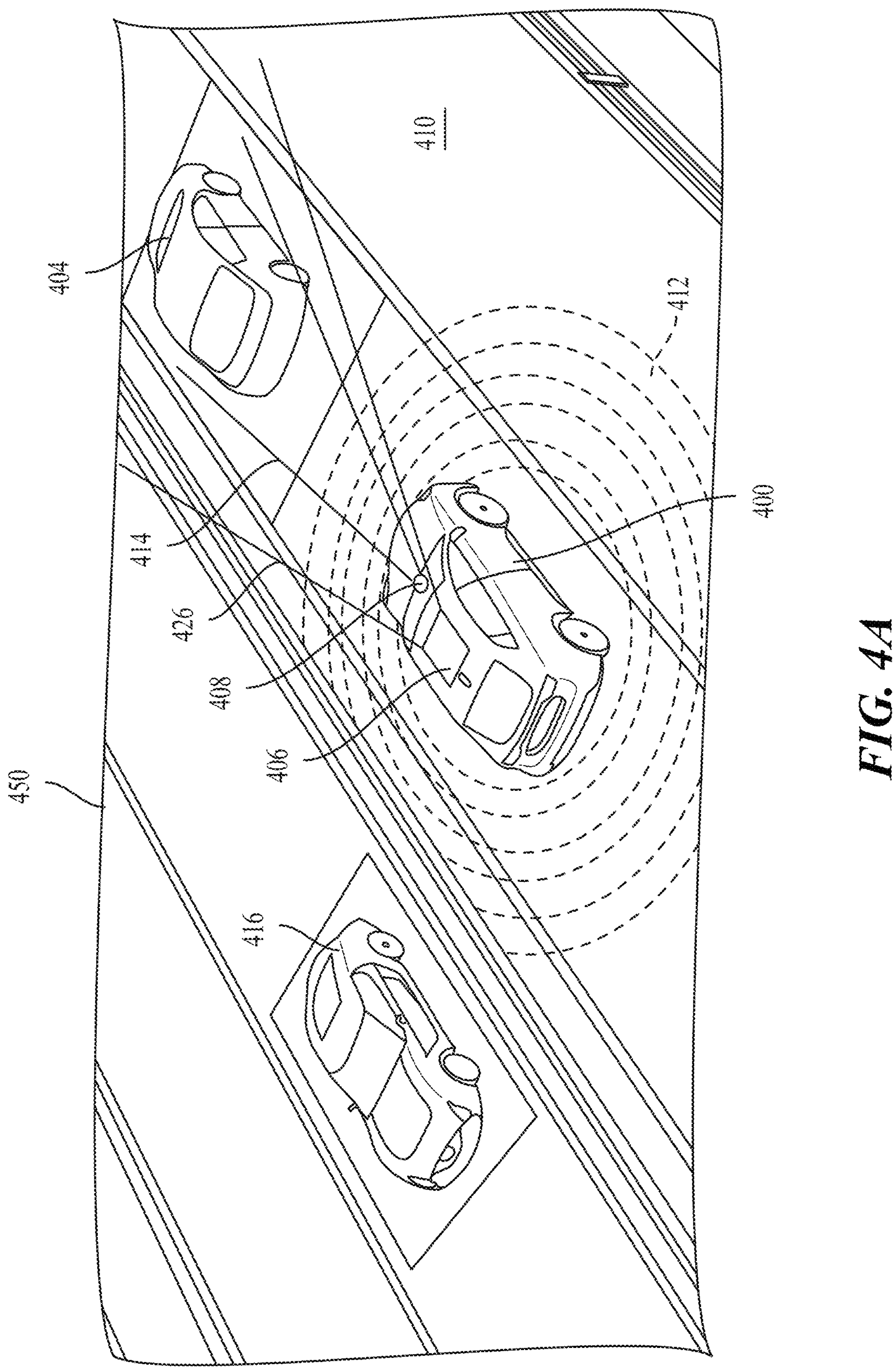
FIGS. 4A-4B are block diagrams illustrating an unsafe speed intervention system, according to aspects of the present disclosure.

Various aspects of the present disclosure may be implemented in an agent, such as a vehicle. The vehicle may operate in either an autonomous mode, a semi-autonomous mode, or a manual mode. In some examples, the vehicle may switch between operating modes. FIG. 4A is a diagram illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the sensor module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward-facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

Figure 4B:
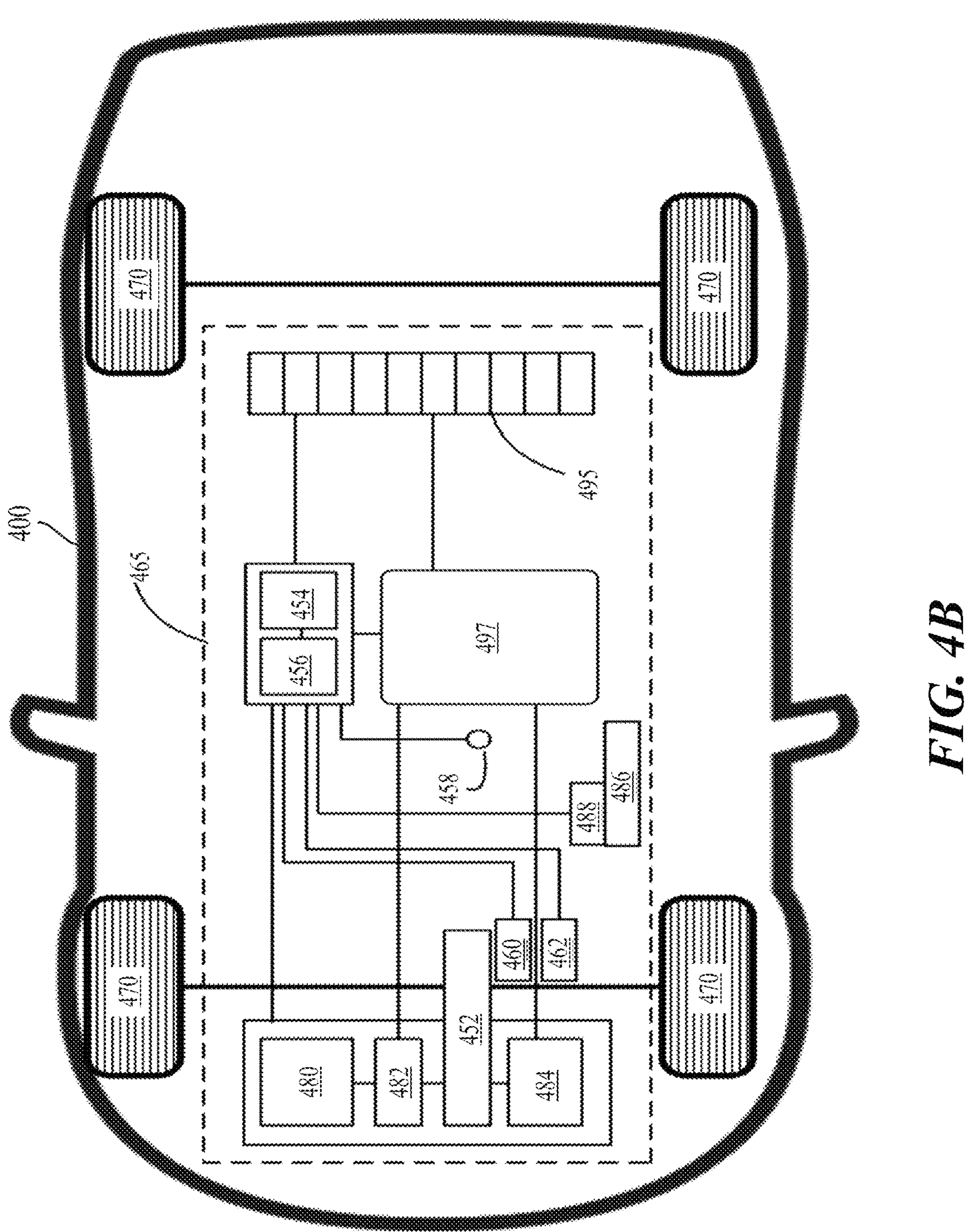

FIG. 4B is a diagram illustrating an example of a vehicle 400, in accordance with various aspects of the present disclosure. Various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode, and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium-ion batteries, lead acid batteries, nickel cadmium batteries, lithium ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules. In some aspects of the present disclosure, the vehicle includes an advanced driver assistance system (ADAS) directed to overlaying an augmented reality (AR) pattern on a windshield of the vehicle 400 to change drivers' speed perception, which helps drivers slow down, or speed up, as desired.

Figure 5A:
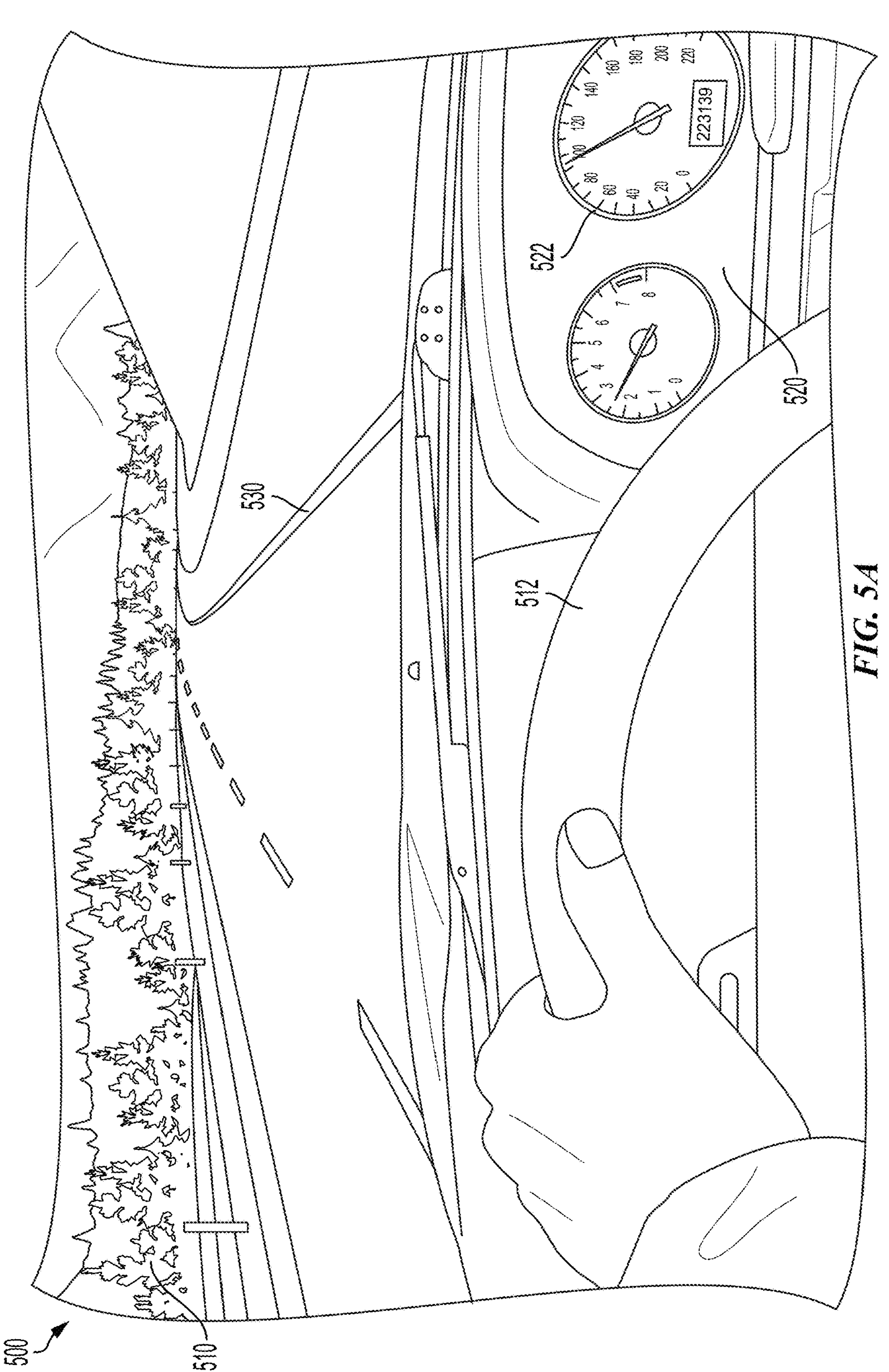
FIGS. 5A and 5B are block diagrams illustrating overlaying of augmented reality patterns on a vehicle windshield in response to unsafe speed detection, according to aspects of the present disclosure.
Figure 5B:
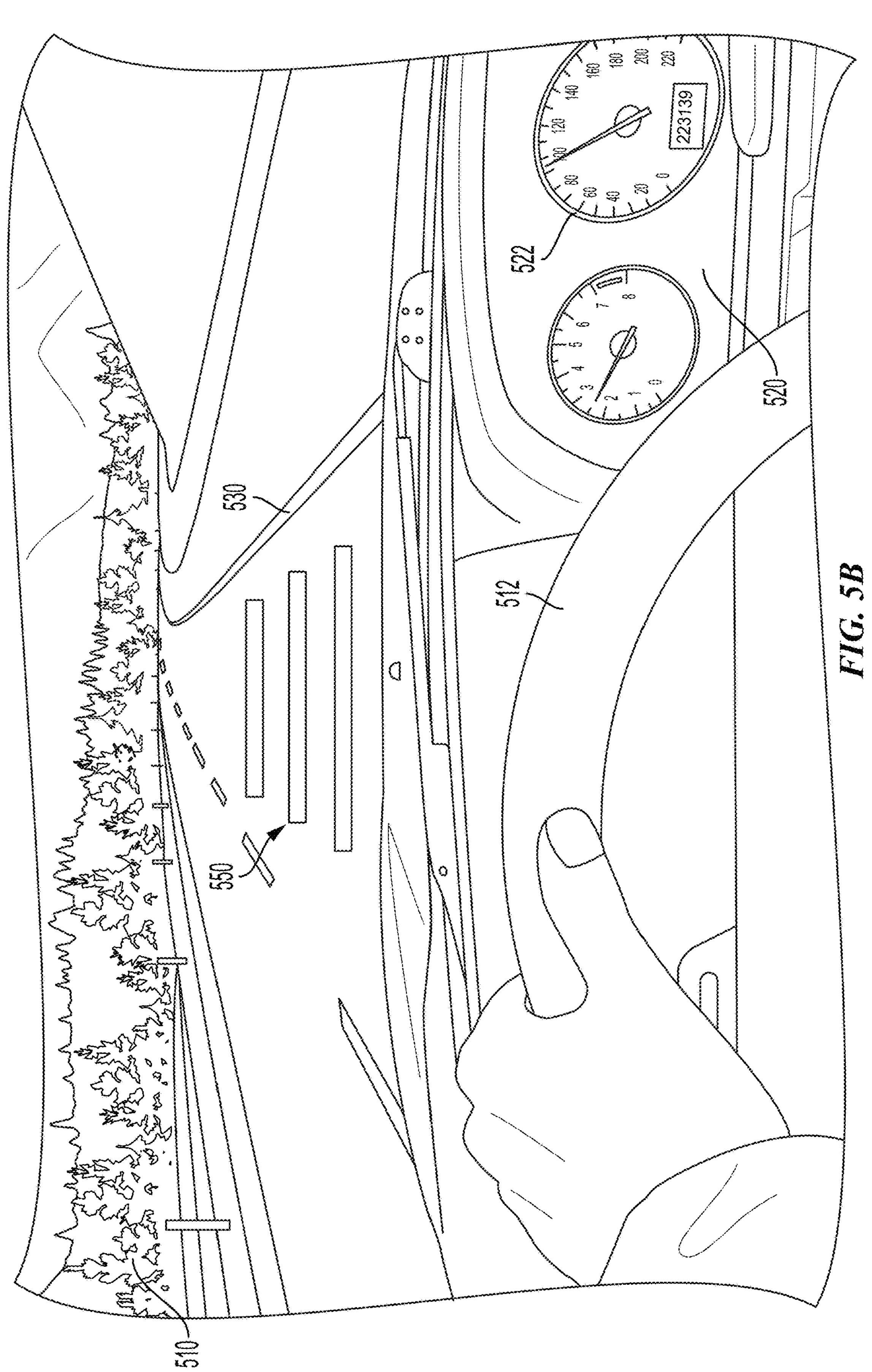

FIGS. 5A and 5B are block diagrams illustrating overlaying of augmented reality patterns on a vehicle windshield in response to unsafe speed detection, according to aspects of the present disclosure. FIG. 5A illustrates the cabin of the vehicle 500, including a windshield 510, a steering wheel 512, and a heads-up display (HUD) 520, including a speedometer 522. According to aspects of the present disclosure, a vehicle speed tracking system (e.g., the unsafe speed detection module 312) may determine whether an initial speed of the vehicle 500 traveling on a roadway 530 is unsafe.

Various factors may be used to determine if the initial speed of the vehicle 500 is unsafe. For example, an unsafe speed may be determined based on the speed limit, current traffic congestion level, road conditions, and/or personal factors of the driver. In this example, a situation is detected in which the driver fails to properly adjust their speed, as the vehicle 500 is traveling at nearly 100 miles per hour (MPH). Some aspects of the present disclosure are directed to providing an interface of the vehicle 500 that encourages drivers to regulate their speed when appropriate.

FIG. 5B is a block diagram further illustrating the vehicle 500 of FIG. 5A, in which an augmented reality (AR) pattern is overlayed on the windshield 510 of the vehicle 500 in response to unsafe speed detection, according to aspects of the present disclosure. In this example, an AR visual pattern 550 is overlayed on the windshield 510 of the vehicle 500 in response to detecting the speed of the vehicle 500 is inappropriate. In some aspects of the present disclosure, the AR pattern overlayed on the windshield 510 of the vehicle 500 shows a visual pattern that continuously moves at a selected speed. In this example, the AR visual pattern 550 is shown as transverse markings; however, other visual patterns, such as chevron markings, optical speed bars, or other markings that cause a driver to perceive vehicle speed are contemplated according to aspects of the present disclosure.

DECREASING VELOCITY LINEAR EQUATION $$L = v_1 * t_b + \frac{(v_1^2 - v_2^2)}{2a}$$

Where:

L=distance between successive pair of transverse bar pairs $pair_1$ and $pair_2$ (ft)

$V_1$=speed at pair 1 (ft/s) (speed at the first pair is the transition zone speed; speed at the last pair is the entrance posted speed limit)

$V_2$=speed at pair 2

$t_b$=perception reaction time (e.g., 0.5 s)

a=deceleration rate (ft/$s^2$)

In some aspects of the present disclosure, the speed of the AR visual pattern 550 is adjusted to give drivers the illusion that they are driving faster or slower than they are in order to encourage the drivers to adjust their speed according to Equation (1). In this example, if the vehicle 500 is moving too fast, the speed of the AR visual pattern 550 is adjusted such that it appears that the vehicle is moving even faster. If the vehicle 500 is moving too slow, the speed of the AR visual pattern 550 is adjusted such that it appears that the vehicle is moving even slower. By making drivers think that they are driving even faster or slower than they are, the drivers may be encouraged to slow down or speed up. In some aspects of the present disclosure, after the AR visual pattern 550 is displayed, the speed of the vehicle 500 is continually monitored. If additional vehicle speed adjustments are desired, the speed of the AR visual pattern 550 is adjusted. If the driver adjusts the speed of the vehicle 500 to an appropriate speed, the AR visual pattern 550 is removed, for example, according to a process shown in FIG. 6.

Figure 6:
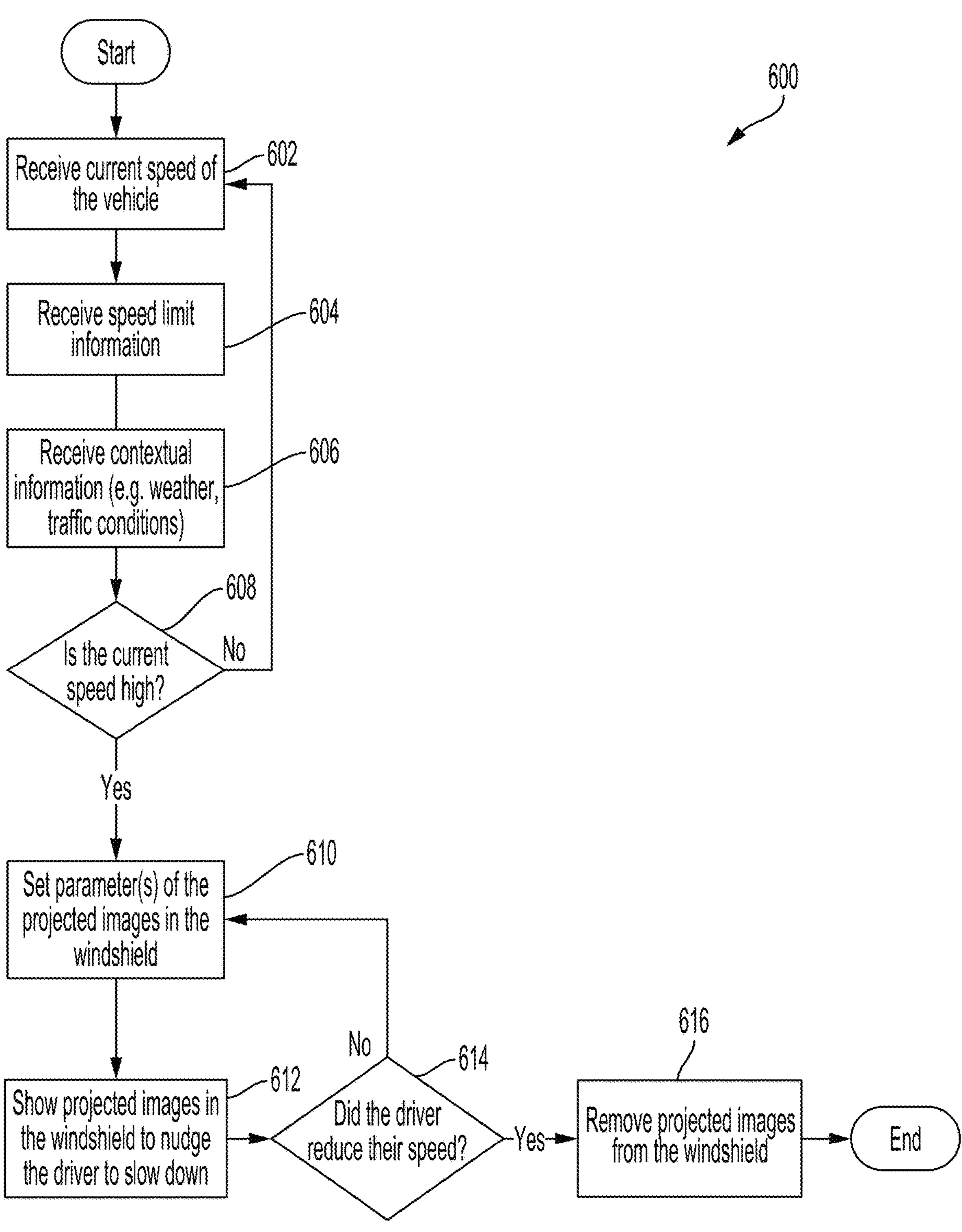
FIG. 6 is a flowchart illustrating a method for a high-speed intervention system, according to aspects of the present disclosure.

FIG. 6 is a flowchart illustrating a method for a high-speed intervention system, according to aspects of the present disclosure. A method 600 begins at block 602, in which a current speed of a vehicle is received. For example, as shown in FIG. 5A, the vehicle 500 is traveling at nearly 100 miles per hour (MPH). At block 604, speed limit information is received. Additionally, at block 606, contextual information (e.g., weather, traffic conditions, etc.) is received. At block 608, a determination is made as to whether the current speed is high. For example, as shown in FIG. 3, the unsafe speed detection module 312 uses the various factors received at block 606 to determine if the current speed of the car 350 is high. FIG. 5A illustrates a situation in which the driver fails to properly adjust their speed, as the vehicle 500 is traveling at a high speed of nearly 100 miles per hour (MPH). That is, assuming a 55 MPH speed limit, the 100 MPH speed of the vehicle 500 is greater than the 55 MPH speed limit by more than a predetermined amount (e.g., 10 MPH).

At block 610, parameters of the projected images on the windshield of the vehicle are set. At block 612, the projected image is shown on the vehicle windshield to nudge the driver to slow down. For example, as shown in FIG. 5B, the AR visual pattern 550 is overlayed on the windshield 510 of the vehicle 500 in response to detecting the speed of the vehicle 500 is high. At block 614, a determination is made as to whether the driver reduced the vehicle speed. In this example, blocks 610 to 612 are repeated until the driver reduces the vehicle speed. For example, as shown in FIG. 5B, a speed of the AR visual pattern 550 is adjusted to give drivers the illusion that they are driving faster or slower than they actually are in order to encourage the drivers to adjust their speed according to Equation (1). At block 616, the projected images are removed from the windshield 510 once the driver reduces the speed of the vehicle. For example, as shown in FIG. 5B, if the driver adjusts the speed of the vehicle 500 to an appropriate speed, the AR visual pattern 550 is removed.

Figure 7:
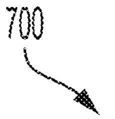
FIG. 7 is a flowchart illustrating a method for an unsafe speed intervention system, according to aspects of the present disclosure.
Figure 7:
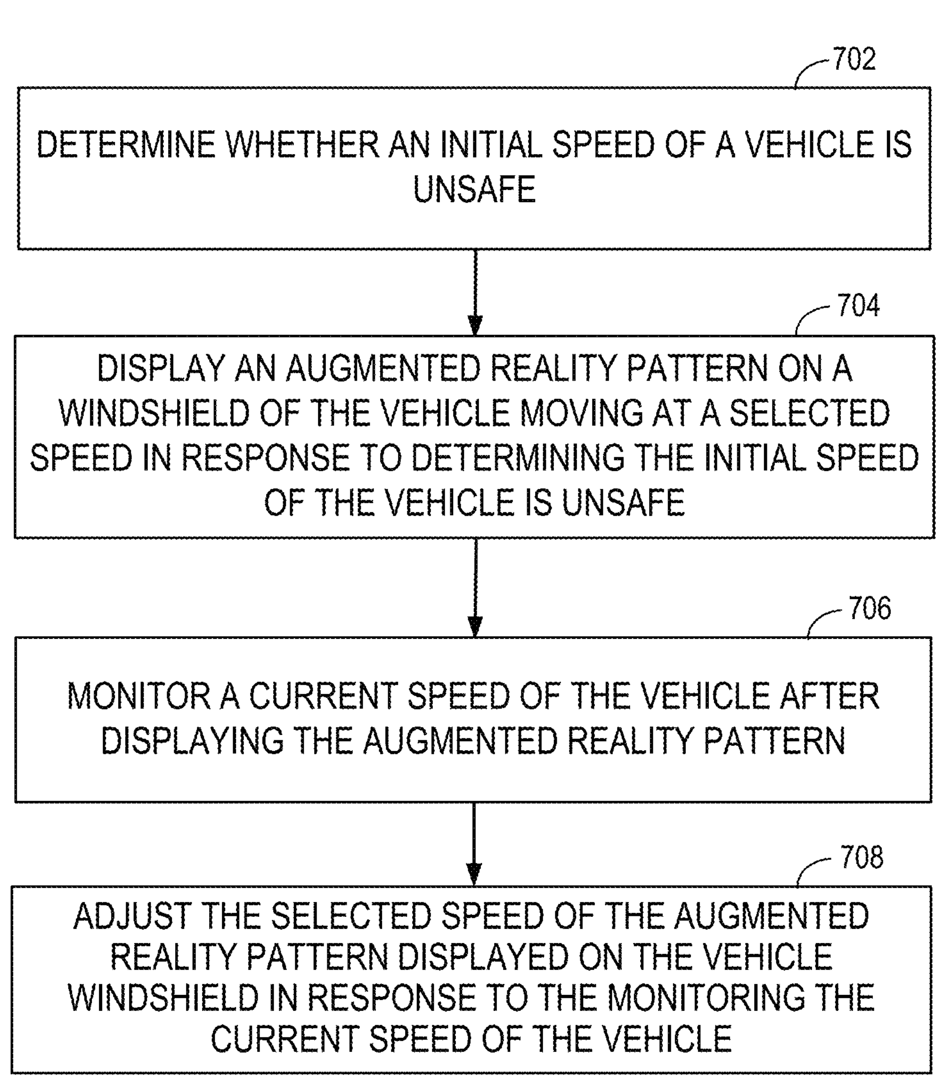

FIG. 7 is a flowchart illustrating a method for an unsafe speed intervention system, according to aspects of the present disclosure. A method 700 begins at block 702, in which it is determined whether an initial speed of a vehicle is unsafe. For example, as shown in FIG. 3, the unsafe speed detection module 312 uses the various factors received at block 606 to determine if the current speed of the car 350 is high. FIG. 5A illustrates a situation in which the driver fails to properly adjust their speed, as the vehicle 500 is traveling at a high speed of nearly 100 miles per hour (MPH). That is, assuming a 55 MPH speed limit, the nearly 100 MPH speed of the vehicle 500 is greater than the 55 MPH speed limit by more than a predetermined amount (e.g., 10 MPH).

At block 704 an augmented reality pattern is displayed on a windshield of the vehicle moving at a selected speed in response to determining the initial speed of the vehicle is unsafe. For example, as shown in FIG. 5B, an AR visual pattern 550 is overlayed on the windshield 510 of the vehicle 500 in response to detecting the speed of the vehicle 500 is inappropriate. In some aspects of the present disclosure, the AR pattern overlayed on the windshield 510 of the vehicle 500 shows a visual pattern that continuously moves at a selected speed. In this example, the AR visual pattern 550 is shown as transverse markings; however, other visual patterns, such as chevron markings, optical speed bars, or other markings that cause a driver to perceive vehicle speed are contemplated according to aspects of the present disclosure.

At block 706, a current speed of the vehicle is monitored after displaying the augmented reality pattern. For example, as shown in FIG. 5B, the AR visual pattern 550 is overlayed on the windshield 510 of the vehicle 500 in response to detecting the speed of the vehicle 500 is high. At block 614, a determination is made as to whether the driver reduced the vehicle speed. In this example, blocks 610 to 612 are repeated until the driver reduces the vehicle speed.

At block 708, the selected speed of the augmented reality pattern displayed on the vehicle windshield is adjusted in response to the monitoring the current speed of the vehicle. For example, as shown in FIG. 5B, a speed of the AR visual pattern 550 is adjusted to give drivers the illusion that they are driving faster or slower than they actually are in order to encourage the drivers to adjust their speed according to Equation (1). At block 616, the projected images are removed from the windshield 510 once the driver reduces the speed of the vehicle. For example, as shown in FIG. 5B, if the driver adjusts the speed of the vehicle 500 to an appropriate speed, the AR visual pattern 550 is removed.

The method 700 includes determining whether a speed of the vehicle is inappropriate. Determining an inappropriate vehicle speed includes receiving the initial speed of the vehicle. This is followed by determining a speed limit of a roadway in which the vehicle is traveling. The method 700 further includes determining the initial speed of the vehicle is inappropriate if the initial speed of the vehicle is greater than the speed limit by a predetermined amount. The 700 also includes receiving contextual driving environment information. Once received, the method 700 includes setting the predetermined amount according to the contextual driving environment information. The method 700 further includes displaying the augmented reality pattern on the vehicle windshield further. The method 700 further displays the augmented reality pattern by setting parameters of the augmented reality pattern when the initial speed of the vehicle is greater than the speed limit by the predetermined amount. Once the parameters are set, the method 700 includes projecting the augmented reality pattern on the vehicle windshield based on the setting of the parameters.

In some aspects of the present disclosure, the method shown in FIG. 7 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102), and/or other components included therein of the vehicle 150, or the unsafe speed intervention system 300.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for an unsafe speed intervention system, the method comprising:

determining an initial speed of a vehicle is unsafe when a difference between the initial speed and a speed limit is greater than a predetermined amount;

computing a distance between successive transverse pattern pairs of an augmented reality transverse marking pattern based on the initial speed and a transition speed to the speed limit;

overlaying a pattern on a windshield of the vehicle to project the augmented reality transverse marking pattern onto a road repeatedly moving toward the vehicle at a selected speed using the computed distance between successive transverse pattern pairs in response to determining the initial speed of the vehicle is unsafe;

monitoring a current speed of the vehicle after overlaying the pattern on the windshield of the vehicle to project the augmented reality transverse marking patterns onto the road; and adjusting the selected speed and the computed distance of the augmented reality transverse marking patterns projected onto the road and repeatedly moving at an adjusted speed using the adjusted distance in response to the monitoring the current speed of the vehicle.

2. The method of claim 1, in which determining whether a speed of the vehicle is inappropriate comprises:

receiving the initial speed of the vehicle;

determining the speed limit of a roadway in which the vehicle is traveling; and determining the initial speed of the vehicle is inappropriate when the initial speed of the vehicle is greater than the speed limit by the predetermined amount.

3. The method of claim 2, in which determining whether the initial speed of the vehicle is inappropriate comprises:

receiving contextual driving environment information; and setting the predetermined amount according to the contextual driving environment information.

4. The method of claim 2, in which overlaying the augmented reality transverse marking pattern on the vehicle windshield further comprises:

setting parameters of the augmented reality transverse marking pattern when the initial speed of the vehicle is greater than the speed limit by the predetermined amount; and projecting the augmented reality transverse marking pattern to overlay the augmented reality transverse marking pattern on the vehicle windshield based on the setting of the parameters.

5. The method of claim 1, in which adjusting the selected speed comprises decreasing the selected speed of the augmented reality transverse marking pattern when the current speed of the vehicle after the overlaying of the augmented reality transverse marking pattern is equal to or greater than the initial speed.

6. The method of claim 1, in which adjusting the selected speed comprises increasing the selected speed of the augmented reality transverse marking pattern when the current speed of the vehicle after the overlaying of the augmented reality transverse marking pattern is equal to or less than the initial speed.

7. The method of claim 1, in which adjusting the selected speed comprises removing the augmented reality transverse marking pattern when the current speed of the vehicle after the overlaying of the augmented reality transverse marking pattern is greater than the initial speed.

8. The method of claim 1, in which adjusting the selected speed comprises increasing the selected speed of the augmented reality transverse marking pattern when the current speed of the vehicle after the overlaying of the augmented reality transverse marking pattern is less than the initial speed.

9. A non-transitory computer-readable medium having program code recorded thereon for an unsafe speed intervention system, the program code being executed by a processor and comprising:

program code to determine an initial speed of a vehicle is unsafe when a difference between the initial speed and a speed limit is greater than a predetermined amount;

program code to compute a distance between successive transverse pattern pairs of an augmented reality transverse marking pattern based on the initial speed and a transition speed to the speed limit;

program code to overlay a pattern on a windshield of the vehicle to project the augmented reality transverse marking pattern onto a road repeatedly moving toward the vehicle at a selected speed using the computed distance between successive transverse pattern pairs in response to determining the initial speed of the vehicle is unsafe;

program code to monitor a current speed of the vehicle after overlaying the pattern on the windshield of the vehicle to project the augmented reality transverse marking patterns onto the road; and program code to adjust the selected speed and the computed distance of the augmented reality transverse marking patterns projected onto the road and repeatedly moving at an adjusted speed using the adjusted distance in response to the monitoring the current speed of the vehicle.

10. The non-transitory computer-readable medium of claim 9, in which the program code to determine whether a speed of the vehicle is inappropriate comprises:

program code to receive the initial speed of the vehicle;

program code to determine the speed limit of a roadway in which the vehicle is traveling; and program code to determine the initial speed of the vehicle is inappropriate when the initial speed of the vehicle is greater than the speed limit by the predetermined amount.

11. The non-transitory computer-readable medium of claim 10, in which the program code to determine whether the initial speed of the vehicle is inappropriate comprises:

program code to receive contextual driving environment information; and program code to set the predetermined amount according to the contextual driving environment information.

12. The non-transitory computer-readable medium of claim 10, in which the program code to overlay the augmented reality transverse marking pattern on the vehicle windshield further comprises:

program code to set parameters of the augmented reality transverse marking pattern when the initial speed of the vehicle is greater than the speed limit by the predetermined amount; and program code to project the augmented reality transverse marking pattern to overlay the augmented reality transverse marking pattern on the vehicle windshield based on the setting of the parameters.

13. The non-transitory computer-readable medium of claim 9, in which the program code to adjust the selected speed comprises program code to decrease the selected speed of the augmented reality transverse marking pattern when the current speed of the vehicle after the overlay of the augmented reality transverse marking pattern is equal to or greater than the initial speed.

14. The non-transitory computer-readable medium of claim 9, in which the program code to adjust the selected speed comprises program code to increase the selected speed of the augmented reality transverse marking pattern when the current speed of the vehicle after the overlay of the augmented reality transverse marking pattern is equal to or less than the initial speed.

15. The non-transitory computer-readable medium of claim 9, in which the program code to adjust the selected speed comprises program code to remove the augmented reality transverse marking pattern when the current speed of the vehicle after the overlay of the augmented reality transverse marking pattern is greater than the initial speed.

16. The non-transitory computer-readable medium of claim 9, in which the program code to adjust the selected speed comprises program code to increase the selected speed of the augmented reality transverse marking pattern when the current speed of the vehicle after the overlay of the augmented reality transverse marking pattern is less than the initial speed.

17. A system for an unsafe speed intervention, the system comprising:

an unsafe speed detection module to determine an initial speed of a vehicle is unsafe when a difference between the initial speed and a speed limit is greater than a predetermined amount;

an augmented reality (AR) pattern overlay module to compute a distance between successive transverse pattern pairs of an augmented reality transverse marking pattern based on the initial speed and a transition speed to the speed limit to overlay a pattern on a windshield of the vehicle to project the augmented reality transverse pattern onto a road repeatedly moving toward the vehicle at a selected speed using the computed distance between successive transverse pattern pairs in response to determining the initial speed of the vehicle is unsafe;

a vehicle speed monitor module to monitor a current speed of the vehicle after overlaying the pattern on the windshield of the vehicle to project the augmented reality transverse marking patterns onto the road; and an AR pattern speed adjustment module to adjust and the computed distance of the augmented reality transverse marking patterns projected onto the road and repeatedly moving at an adjusted speed using the adjusted distance in response to the monitoring the current speed of the vehicle.

18. The system of claim 17, in which the AR pattern speed adjustment module is further to increase the selected speed of the augmented reality transverse marking pattern when the current speed of the vehicle after the overlay of the augmented reality transverse marking pattern is equal to or less than the initial speed.

19. The system of claim 17, in which the AR pattern speed adjustment module is further to remove the augmented reality transverse marking pattern when the current speed of the vehicle after the overlay the augmented reality transverse marking pattern is less than the initial speed.

20. The system of claim 17, in which the AR pattern speed adjustment module is further to increase the selected speed of the augmented reality transverse marking pattern when the current speed of the vehicle after the overlay of the augmented reality transverse marking pattern is less than the initial speed.

* * * * *